(12) United States Patent
Zhu et al.

(10) Patent No.: US 12,203,704 B2
(45) Date of Patent: Jan. 21, 2025

(54) DYNAMIC SEALING STRUCTURE AND ROTARY KILN APPARATUS

(71) Applicant: HENAN LONGCHENG COAL HIGH EFFICIENCY TECHNOLOGY APPLICATION CO., LTD., Henan (CN)

(72) Inventors: Shucheng Zhu, Henan (CN); Xibin Wang, Henan (CN); Fang Li, Henan (CN); Jinfeng Li, Henan (CN); Yanwu Lv, Henan (CN); Yi Ren, Henan (CN)

(73) Assignee: HENAN LONGCHENG COAL HIGH EFFICIENCY TECHNOLOGY APPLICATION CO., LTD. (CN)

( * ) Notice: Subject to any disclaimer, the term of this patent is extended or adjusted under 35 U.S.C. 154(b) by 361 days.

(21) Appl. No.: 17/790,013

(22) PCT Filed: May 9, 2020

(86) PCT No.: PCT/CN2020/089471
§ 371 (c)(1),
(2) Date: Jun. 29, 2022

(87) PCT Pub. No.: WO2021/147210
PCT Pub. Date: Jul. 29, 2021

(65) Prior Publication Data
US 2023/0033720 A1 Feb. 2, 2023

(30) Foreign Application Priority Data
Jan. 21, 2020 (CN) .......................... 202010068716.0

(51) Int. Cl.
F27B 7/24 (2006.01)
F27B 7/38 (2006.01)
F27D 9/00 (2006.01)

(52) U.S. Cl.
CPC .................. *F27B 7/24* (2013.01); *F27B 7/38* (2013.01); *F27D 9/00* (2013.01); *F27D 2009/0008* (2013.01)

(58) Field of Classification Search
CPC ...... F23G 2203/212; F27B 7/24; D06F 58/08; F26B 11/02
See application file for complete search history.

(56) References Cited

FOREIGN PATENT DOCUMENTS

| CN | 202853347 U | 4/2013 |
|---|---|---|
| CN | 103603955 A | 2/2014 |
| (Continued) | | |

OTHER PUBLICATIONS

International Search Report corresponding to PCT/CN2020/089471 dated Oct. 16, 2020.

(Continued)

*Primary Examiner* — Gregory A Wilson
(74) *Attorney, Agent, or Firm* — Barnes & Thornburg LLP

(57) ABSTRACT

Provided are dynamic sealing structure and rotary kiln apparatus. Dynamic sealing structure includes kiln tail, discharging cover, sealing mechanism, guiding mechanism and balancing device. Discharging cover includes discharging cover cylinder and discharging cover end face connected to same, discharging cover cylinder is arranged on outer side of circumferential wall of kiln tail in sleeving manner, and discharging cover end face and end face of the kiln tail are arranged at intervals. Sealing mechanism is arranged between discharging cover cylinder and kiln tail and is connected to inner wall of discharging cover cylinder. Guiding mechanism is arranged between inner wall of discharging cover cylinder and outer side of kiln tail, and is located on one side or two sides of sealing mechanism in axial direction of rotary kiln, rotating gap is provided between (Continued)

guiding mechanism and kiln tail, and balancing device is connected to outer side of the discharging cover cylinder.

19 Claims, 6 Drawing Sheets

(56) References Cited

FOREIGN PATENT DOCUMENTS

| CN | 203731847 U | | 7/2014 | |
|---|---|---|---|---|
| CN | 104515382 A | | 4/2015 | |
| CN | 208504399 U | | 2/2019 | |
| CN | 111141143 A | * | 5/2020 | ................ F27B 7/24 |
| CN | 212930939 U | * | 4/2021 | ................ F27B 7/20 |
| CN | 214830109 U | * | 11/2021 | ............. C10B 47/18 |
| CN | 217275498 U | * | 8/2022 | |
| CN | 220018120 U | * | 11/2023 | |
| CN | 220304205 U | * | 1/2024 | |
| JP | 2018017468 A | | 2/2018 | |
| KR | 101669459 B1 | * | 10/2016 | |

OTHER PUBLICATIONS

Written Opinion corresponding to PCT/CN2020/089471 dated Oct. 16, 2020.

* cited by examiner

DYNAMIC SEALING STRUCTURE AND ROTARY KILN APPARATUS

CROSS-REFERENCE TO RELATED APPLICATIONS

The present utility patent application is a U.S. national stage entry of international application no. PCT/CN2020/089471 and claims the priority of the Chinese Patent Application No. 202010068716.0, entitled as "Dynamic Sealing Structure and Rotary Kiln Apparatus", filed with the China Patent Office on Jan. 21, 2020, the entire contents of each of which are incorporated herein by reference.

TECHNICAL FIELD

The present application belongs to the technical field of sealing, and particularly relates to a dynamic sealing structure and rotary kiln apparatus.

BACKGROUND ART

The sealing, which the rotary kiln mostly uses, is the fish scale sealing, which has been satisfied for the sealing for the kiln, such as the lime kiln, which has a relatively safe environment therein. However, as for the situation of pyrolysis coal in which the coal gas has both toxicity and major safety problems, more strict sealing is required. It not only requires that the laying-off cover and the rotary kiln are strictly sealed, but also requires that the laying-off port on the laying-off cover and the receiving silo port are absolutely sealed. The coal gas outlet on the laying-off cover and the coal gas pipeline port need to be strictly sealed.

The axis of the rotary kiln cannot be a straight line, and jumping will be along with the rotation. How to ensure the sealing of the laying-off cover and the rotary kiln when the rotary kiln is jumping and ensure simultaneously the sealing between the laying-off port on the laying-off cover and the receiving silo port and the sealing between the coal gas outlet on the laying-off cover and the coal gas pipeline port has become the focus of research.

SUMMARY

The present application includes providing a dynamic sealing structure, which has good overall sealing effect, is applicable to the pyrolysis rotary kilns of coal or oil shale or biomass, and can at least solve the problem in the prior art that the sealing performance is poor due to the jumping of the rotary kiln.

The present application also includes providing a rotary kiln apparatus, which at least has the technical effects of strong practicability and broad application prospects.

The present application solves its technical problems by adopting the following technical solutions.

The embodiment of the present application proposes a dynamic sealing structure, which comprises a kiln tail, a laying-off cover, a sealing mechanism, a guiding mechanism and a balancing device.

The laying-off cover comprises a laying-off cover cylinder and a laying-off cover end face connected with the laying-off cover cylinder, the laying-off cover cylinder is sleeved on an outer side of a circumferential wall of the kiln tail, and the laying-off cover end face and the end face of the kiln tail are arranged at an interval.

The sealing mechanism is arranged between the laying-off cover cylinder and the kiln tail and is connected with an inner wall of the laying-off cover cylinder.

The guiding mechanism is arranged between an inner wall of the laying-off cover cylinder and an outer side of the kiln tail and is located on one side or two sides of the sealing mechanism along an axial direction of the rotary kiln, and a rotating gap is provided between the guiding mechanism and the kiln tail, so that the sealing mechanism is coaxial with the kiln tail.

The balancing device is connected to an outer side of the laying-off cover cylinder and is configured to control the laying-off cover to exert on the kiln tail a force less than or equal to 10% of gravity of the laying-off cover in any direction.

Optionally, an interval between the laying-off cover end face and an end face of the kiln tail in an axial direction of the kiln tail is 0.3-2.0 m.

Optionally, the guiding mechanism is located on both sides of the sealing mechanism along the axial direction of the rotary kiln.

Optionally, the rotating gap is greater than sum of cylindricity error of the kiln tail and cylindricity error of the laying-off cover cylinder.

Optionally the sealing mechanism comprises at least one rubber sealing ring.

Optionally, when the rubber sealing ring is in a number greater than 1, the plurality of the rubber sealing rings are arranged at intervals along an axial direction of the kiln tail.

Optionally, the sealing mechanism is a "herringbone"-shaped rubber sealing ring having two sealing lips.

Optionally, the sealing lips have a deformability or compensation within 6 mm.

Optionally, the dynamic sealing structure further comprises a sealed smooth sliding belt arranged on an outer side of the kiln tail, a first ring plate is connected between the smooth sliding belt and an end face of the kiln tail, one end of the smooth sliding belt away from the end face of the kiln tail is connected with a second ring plate, a first gap is provided between the second ring plate and an outer wall of the kiln tail, a plurality of adjusting members configured to adjust size of the first gap are arranged along an circumferential direction, between the second ring plate and the outer wall of the kiln tail.

Optionally, an outer wall of the kiln tail between the first ring plate and the second ring plate is provided with a multi-head helical blade or an inclined plate forming an included angle with respect to an axis of the kiln tail.

Optionally, a second gap is provided between the multi-head helical blade and an inner side wall of the smooth sliding belt or between the inclined plate and the inner side wall of the smooth sliding belt.

Optionally, a cooling nozzle is provided on an outer side of the adjusting member away from an end face of the kiln tail.

Optionally, the first ring plate, the sealed smooth sliding belt, and the kiln tail are sealingly welded together.

Optionally, the adjusting member comprises an adjusting block or an adjusting bolt, which is configured to adjust coaxiality between the smooth sliding belt and the kiln tail.

Optionally, the first ring plate comprises a thermal insulation layer; and the second ring plate comprises a thermal insulation layer.

Optionally, an included angle formed between the multi-head helical blade and an axis of the kiln tail is in an angle range of 5-30°; or, an include angle formed between the inclined plate (sheet) and an axis of the kiln tail is in an angle range of 5-10°.

Optionally, the multi-head helical blade is welded with an outer wall of the kiln tail; or the inclined plate is welded with the outer wall of the kiln tail.

Optionally, the sealing mechanism and the guiding mechanism are arranged between the laying-off cover cylinder and the smooth sliding belt, and the sealing lips of the "herringbone"-shaped rubber sealing ring are sealingly contacted with the smooth sliding belt.

Optionally, when the "herringbone"-shaped rubber sealing rings are in number greater than 1, a first spacer ring is provided between two adjacent "herringbone"-shaped rubber sealing rings, and the outermost "herringbone"-shaped rubber sealing rings have outer sides which are each provided with a second spacer ring.

Optionally, the guiding mechanism is composed of two guiding sliding rings, the two guiding sliding rings are respectively arranged on an outer side of the second spacer ring, and a third gap is provided between the guiding sliding ring and the smooth sliding belt.

Optionally, an outer side of the guiding sliding ring is provided with a fixing member, and the fixing member comprises a fixing sliding ring or a step of an inner wall of the laying-off cover cylinder.

Optionally, the guiding sliding ring is a wear-resistant copper sliding ring.

Optionally, each of the "herringbone"-shaped rubber sealing rings is provided with a first oil hole configured to be filled with lubricating oil.

Optionally, the guiding sliding ring is provided with a second oil hole configured to be filled with lubricating oil.

Optionally, the dynamic sealing structure further comprises a discharging system, and the discharging system is arranged below the laying-off cover cylinder, the discharging system comprises a laying-off port, a laying-off port sealing mechanism and a receiving silo port, the laying-off port is located between an end face of the kiln tail and an laying-off cover end face, the laying-off port has one end connected with a bottom of the laying-off cover cylinder and the other end connected with the receiving silo port through the laying-off port sealing mechanism; and the laying-off port sealing mechanism is filled with liquid low-temperature alloy.

Optionally, the low-temperature alloy filled in the laying-off port sealing mechanism comprises lead, tin and bismuth; and preferably, the low-temperature alloy filled in the laying-off port sealing mechanism is composed of lead, tin and bismuth.

Optionally, the dynamic sealing structure further comprises a coal gas outlet system, the coal gas outlet system comprises a coal gas outlet, a coal gas outlet sealing mechanism and a coal gas pipeline port, the coal gas outlet is arranged on the laying-off cover, the coal gas outlet has one end connected with the laying-off cover and the other end connected with the coal gas pipeline port through the coal gas outlet sealing mechanism, and the coal gas outlet sealing mechanism is filled with liquid low-temperature alloy.

Optionally, the coal gas outlet is arranged at a top end of the laying-off cover cylinder and communicates with the laying-off cover.

Optionally, the coal gas outlet is arranged on the laying-off cover end face and communicates with the laying-off cover.

Optionally, the coal gas outlet is arranged on one side or two sides of the laying-off cover cylinder and communicates with the laying-off cover.

Optionally, the coal gas outlet system and the discharging system share one discharging system.

Optionally, the low-temperature alloy filled in the coal gas outlet sealing mechanism comprises lead, tin and bismuth; and preferably, the low-temperature alloy filled in the coal gas outlet sealing mechanism is composed of lead, tin and bismuth.

Optionally, the balancing device comprises connected lifting lugs provided on an outer wall of the laying-off cover cylinder, and the plurality of the lifting lugs are provided as spaced apart from each other, and the plurality of the lifting lugs are all located outside a gravity center of the laying-off cover and it is not the case that all of the lifting lugs are on the same side of the gravity center of the laying-off cover.

Optionally, a pair of symmetrical lifting lugs are arranged on the laying-off cover cylinder, near the laying-off cover end face, one lifting lug is provided on the laying-off cover cylinder, at a top end away from the laying-off cover end face, the three lifting lugs are respectively located outside of the gravity center of the laying-off cover, and it is not the case that the three lifting lugs are on one side of the gravity center of the laying-off cover.

Optionally, the lifting lugs are arranged on an upper part of an outer wall of the laying-off cover cylinder; or the lifting lugs are arranged on a side part of an outer wall of the laying-off cover cylinder; or the lifting lugs are arranged at a bottom of an outer wall of the laying-off cover cylinder.

Optionally, each of the lifting lugs is connected with a steel cable with an adjustable length, and the other ends of all the steel cables away from the lifting lugs are together connected with a steel ring.

Optionally, a first tensioner which is upward is connected above the steel ring.

Optionally, the first tensioner is a pulley mechanism or a constant force spring hanger.

Optionally, the balancing device further comprises a frame disposed on both sides of and above the laying-off cover, and the frame is configured to bear a tension force generated by the first tensioner.

Optionally, when the laying-off cover is in a hoisted state, the steel cable configured to adjust the adjustable length is configured in such a way that an axis of the laying-off cover is parallel to an axis of an inclined rotary kiln, so that tension force of the first tensioner is equal to gravity of the laying-off cover.

Optionally, the balancing device further comprises at least one pair of second horizontal tensioners disposed between two sides of the laying-off cover cylinder and the frame, the tension forces of each pair of the second horizontal tensioners in the horizontal direction are equal to each other in magnitude and opposite in direction.

Optionally, each of the second horizontal tensioners is a pulley mechanism or a constant force spring hanger.

Optionally, value of the tension force of each of the second horizontal tensioners is less than or equal to 5% of gravity of the laying-off cover.

Optionally, a spacing distance between the laying-off cover end face and the end face of the kiln tail in an axial direction of the kiln tail is positively proportional to a diameter of the rotary kiln; and a spacing distance between the laying-off cover end face and the end face of the kiln tail in an axial direction of the kiln tail is positively proportional to a discharge amount of the rotary kiln.

The embodiment of the present application also proposes a rotary kiln apparatus, which comprises the dynamic sealing structure mentioned above.

The beneficial effects of the dynamic sealing structure and the rotary kiln apparatus in the present application include the following.

The dynamic sealing structure provided by the present application realizes, through providing the guiding mechanism, that the axis of the laying-off cover is coincident with the axis of the rotary kiln, or the deviation is within a small range, so that the eccentricity between the sealing ring and the kiln tail is small in the entire circumferential direction, and the sealing compensation is uniform, which prolongs the service life of the sealing ring while preventing the eccentric compression condition. In addition, the sealing structure is arranged between the laying-off cover cylinder and the kiln tail, so that the overall sealing effect of the dynamic sealing structure is better, and the frictional force of the guiding mechanism can be reduced by providing the balancing device, so that the guiding mechanism and the sealing mechanism are more durable. The dynamic sealing structure mentioned above is applicable to pyrolysis rotary kilns of coal or oil shale or biomass, which can solve the problem in the prior art that the sealing performance is poor due to the jumping of the rotary kiln. The rotary kiln apparatus including the above dynamic sealing structure has strong practicability and wide application prospects.

BRIEF DESCRIPTION OF DRAWINGS

In order to illustrate the technical solutions of the embodiments of the present application more clearly, the drawings that need to be used in the embodiments will be briefly introduced as follows. It should be understood that the following drawings only show some embodiments of the present application, and therefore should not be regarded as a limitation on the scope, and for those ordinarily skilled in the art, other related drawings can also be obtained according to these drawings without any creative efforts.

Figure 1:
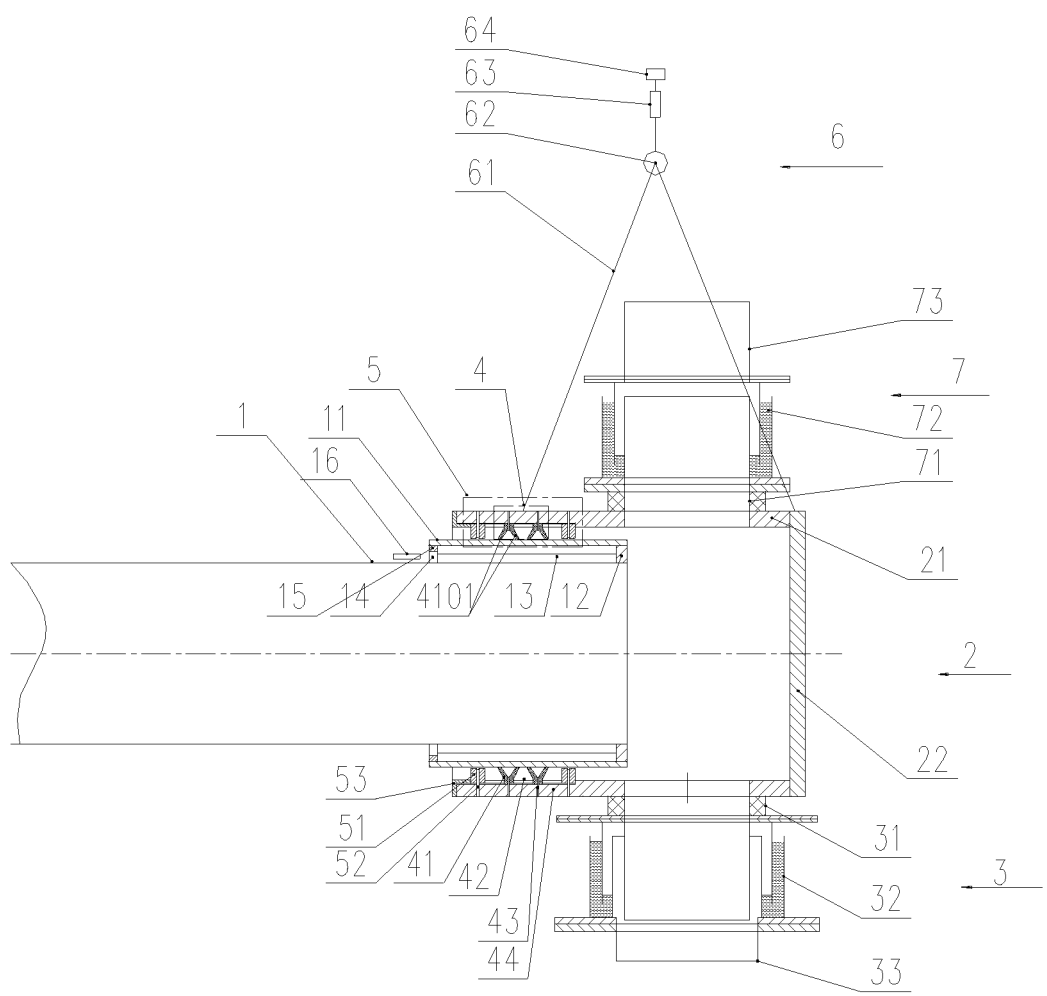
FIG. 1 is a schematic structural view of a dynamic sealing structure provided by Embodiment 1 of the present application.

Reference numbers: 1—kiln tail; 11—smooth sliding belt; 12—first ring plate; 13—multi-head helical blade; 14—adjusting member; 15—second ring plate; 16—cooling nozzle; 2—laying-off cover; 21—laying-off cover cylinder; 22—laying-off cover end face; 3—discharging system; 31—laying-off port; 32—laying-off port sealing mechanism; 33—receiving silo port; 4—sealing mechanism; 41—"herringbone"—shaped rubber sealing ring; 4101—sealing lip; 42—first spacer ring; 43—first oil hole; 44—second spacer ring; 5—guiding mechanism; 51—guiding sliding ring; 52—second oil hole; 53—fixing sliding ring; 6—balancing device; 61—steel cable; 62—steel ring; 63—first tensioner; 64—frame; 65—second tensioner; 7—coal gas outlet system; 71—coal gas outlet; 72—coal gas outlet sealing mechanism; 73—coal gas pipeline port.

DETAILED DESCRIPTION OF EMBODIMENTS

In order to make the purposes, technical solutions and advantages of the embodiments of the present application clearer, the technical solutions in the embodiments of the present application will be described clearly and completely below with reference to the drawings in the embodiments of the present application. Obviously, the described embodiments are part of the embodiments of the present application, but not all of the embodiments. Generally, the components of the embodiments of the present application described and illustrated in the drawings herein may be arranged and designed in a variety of different configurations.

Thus, the following detailed description of the embodiments of the present application provided in the drawings is not intended to limit the scope of the present application as claimed, but is merely representative of selected embodiments of the present application. Based on the embodiments in the present application, all of other embodiments, which are obtained by those ordinarily skilled in the art without creative work, fall within the protection scope of the present application.

In the description of the present application, it should be noted that the orientation or positional relationship indicated by the terms, "upper", "lower", "inner", "outer", etc., is based on the orientation or positional relationship shown in the drawings, or the orientation or positional relationship that the present application product is usually placed in use, which is only for the convenience of describing the present application and simplifying the description, rather than indicating or implying that the device or element referred to must be in the specific orientation, or be constructed and operated in the specific orientation, and therefore it should not be construed as a limitation on the present application. Furthermore, the terms, "first", "second", etc., are only used to describe the distinguishing and should not be construed to indicate or imply the importance of relativity.

Furthermore, the terms, such as the term "vertical", do not imply that components are required to be absolutely vertical, but rather may be slightly inclined. For example, "vertical" only means that its direction is more vertical than "horizontal", and does not mean that the structure must be completely vertical, but can be slightly inclined.

In the description of the present application, it should also be noted that, unless otherwise expressly specified and limited, the terms, "arrangement", "installation" and "connection" should be understood in a broad sense, and for example, it may be a fixed connection or a detachable connection, or an integral connection; may be a mechanical connection or an electrical connection; may be a direct connection, or an indirect connection through an intermediate medium, or an internal communication between two components. For those ordinarily skilled in the art, the specific meanings of the above terms in the present application can be understood in specific situations.

It should be noted that, generally, when the rotary kiln is started, the straightness of the axis is the worst and the jumping of the rotary kiln is also the largest. However, with the long-term operation of the rotary kiln, the straightness will change and it becomes a straight line more and more, and the jumping of the rotary kiln will become smaller and smaller. However, due to the large difference in the local temperature of the kiln body, it is possible that the straightness of the rotary kiln has always been in a poor state, and the jumping of the rotary kiln has always been large. The relatively large jumping is extremely detrimental to the sealing, which requires the relatively large sealing compensation. Unlike the ordinary sealing which generally does not require the relatively large sealing compensation for the problem of jumping, the pyrolysis rotary kilns of coal or biomass require performing the sealing compensation for the relatively large jumping.

The embodiment of the present application proposes a dynamic sealing structure, which comprises a kiln tail 1, a laying-off cover 2, a sealing mechanism 4, a guiding mechanism 5 and a balancing device 6.

The laying-off cover 2 comprises a laying-off cover cylinder 21 and a laying-off cover end face 22 connected with the laying-off cover cylinder 21. The laying-off cover cylinder 21 is sleeved on the outer side of the circumferential wall of the kiln tail 1. The end face 22 of the laying-off cover and the end face of the kiln tail 1 are arranged at an interval in the axial direction of the kiln tail 1, for example, the interval can be 0.3-2.0 m, specifically, 0.3 m, 0.5 m, 1 m, 1.5 m or 2 m, etc. The above-mentioned interval distance is related to the diameter of the rotary kiln and the discharge amount, wherein the interval distance between the end face 22 of the laying-off cover and the end face of the kiln tail 1 in the axial direction of the kiln tail is positively proportional to the diameter of the rotary kiln; and the interval distance between the laying-off cover end face 22 and the end face of the kiln tail 1 in the axial direction of the kiln tail is positively proportional to the discharge amount of the rotary kiln. Specifically, the larger the diameter of the rotary kiln is and the greater the discharge amount is, the greater the distance is, and conversely, the distance is smaller.

The sealing mechanism 4 is arranged between the laying-off cover cylinder 21 and the kiln tail 1 and is connected with the inner wall of the laying-off cover cylinder 21.

Optionally, the sealing mechanism 4 may include at least one rubber sealing ring. Herein when the number of rubber sealing rings is greater than 1, the plurality of rubber sealing rings are arranged at intervals along the axial direction of the kiln tail 1. In some embodiments, the sealing mechanism 4 is a "herringbone"-shaped rubber sealing ring 41 with two sealing lips 4101. Preferably, the deformability or compensation of the above-mentioned sealing lip 4101 can be within 6 mm. The two lips of the above-mentioned "herringbone"-shaped rubber sealing ring 41 are sealing parts with relatively large deformability, which can play a role of compensating the sealing gap.

The guiding mechanism 5 is arranged between the inner wall of the laying-off cover cylinder 21 and the outer side of the kiln tail 1 and is located on one or two sides of the sealing mechanism 4 along the axial direction of the rotary kiln, preferably on both sides of the sealing mechanism 4, which is more conducive to the sealing stability. There is a rotating gap between the guiding mechanism 5 and the kiln tail 1 so that the sealing mechanism 4 is coaxial with the kiln tail 1.

Preferably, the above-mentioned rotating gap is greater than the sum of the cylindricity error of the kiln tail 1 and the cylindricity error of the laying-off cover cylinder 21, so that the guiding mechanism 5 and the kiln tail 1 can rotate relatively to each other without being stuck. The guiding mechanism 5 is not only configured to control the gap (clearance) between the laying-off cover 2 and the kiln tail 1 to be relatively uniform over the entire circumference, but also configured to control the coaxiality between the center of the sealing mechanism 4 and the kiln tail 1.

Optionally, the dynamic sealing structure further comprises a sealed smooth sliding belt 11 arranged on the outer side of the kiln tail 1 to reduce the friction coefficient with the wear-resistant copper sliding ring and the rubber seal. A first ring plate 12 is connected between the smooth sliding belt 11 and the end face of the kiln tail 1. For reference, the first ring plate 12 is welded with the sealed smooth sliding belt 11 and the kiln tail 1, for being sealed.

One end of the smooth sliding belt 11 away from the end face of the kiln tail 1 is connected with a second ring plate 15. A first gap is provided between the second ring plate 15 and the outer wall of the kiln tail 1. A plurality of adjusting members 14, configured to adjust the size of the first gap, are disposed between the second ring plate 15 and the outer wall of the kiln tail 1 along the circumferential direction. The arrangement of the second ring plate 15 can make the lowest end of the back surface of the smooth sliding belt 11 have the cooling effect of an appropriate amount of cooling water. Optionally, the adjusting member 14 may be an adjusting block or an adjusting bolt, the purpose of which comprises adjusting the coaxiality of the smooth sliding belt 11 and the kiln tail 1. The number of adjusting blocks or adjusting bolts is limited, and there is more space between every two adjusting blocks or adjusting bolts.

It is worth noting that, in the embodiment of the present application, the first ring plate 12 and the second ring plate 15 are provided as the thermal insulation layers, rather than the closed cavities. By the above arrangement, the temperature of the smooth sliding belt 11 can be made relatively low. The thermal insulation effect of the thermal insulation layer enables both the rubber sealing material and the lubricating oil to better play their role and performance.

Optionally, the outer wall of the kiln tail 1 between the first ring plate 12 and the second ring plate 15 is provided with the multi-head helical blade 13 or the inclined plate forming an included angle with respect to the axis of the kiln tail 1. For reference, the multi-head helical blade 13 is welded with the outer wall of the kiln tail 1, or the inclined plate is welded with the outer wall of the kiln tail 1. An included angle of 5-30°, such as 15°, is formed between the multi-head helical blade 13 and the axis of the kiln tail 1. Similarly, an included angle of 5-10°, such as 6°, can also be formed between the inclined sheet and the axis of the kiln tail 1.

A second gap is provided between the multi-head helical blade 13 and the inner side wall of the smooth sliding belt 11 or between the inclined plate and the inner side wall of the smooth sliding belt 11.

A cooling nozzle 16 is provided on the outer side of the adjusting member 14 away from the end face of the kiln tail 1. Cooling water or cooling air can pass through the cooling nozzle 16, so that the cooling effect of the thermal insulation layer is better. The effect of the multi-head helical blade 13 or the inclined plate comprises pushing to the first ring plate 12 the water or cooling air ejected from the cooling nozzle 16 during the rotation of the rotary kiln, to make the cooling guide flow more uniform.

The purpose of providing the angle of the multi-head helical blade 13 or the inclined plate is that during the rotation of the kiln, the coolant entering from the first gap can smoothly enter the second gap along the multi-head helical blade 13 or the inclined sheet, so as to achieve the effects of cooling and thermal insulation.

Further, the sealing mechanism 4 and the guiding mechanism 5 are both arranged between the laying-off cover cylinder 21 and the smooth sliding belt 11, and the sealing lips 4101 of the "herringbone"-shaped rubber sealing ring 41 is sealingly contacted with the smooth sliding belt 11, so that it can still perform the compensation to guarantee the sealing performance when there is deviation within a relatively large range (for example, 5 mm) between the axis of the laying-off cover cylinder 21 and the axis of the smooth sliding belt 11. When the number of "herringbone"-shaped rubber sealing rings 41 is greater than 1, a first spacer ring 42 (intermediate spacer ring) is provided between two adjacent "herringbone"-shaped rubber sealing rings 41. The outer side of the outermost "herringbone"-shaped rubber sealing ring 41 in the axis direction of the rotary kiln is provided with a second spacer ring 44.

The guiding mechanism 5 comprises two guiding sliding rings 51. In other words, the guiding mechanism 5 consists of two guiding sliding rings 51. The two guiding sliding rings 51 are respectively arranged on the outer side of the second spacer ring 44. A third gap (rotating gap) is provided between the guiding sliding ring 51 and the smooth sliding belt 11, so as to prevent the stuck phenomenon of the relative rotation between the guiding sliding ring 51 and the smooth sliding belt 11 due to the cylindricity error. For example, the cylindricity error of kiln tail 1 is 0.2 mm, the cylindricity error of the laying-off cover cylinder 21 is 0.3 mm, and the rotating gap is preferably set to be 0.6-0.8 mm, so as to avoid the stuck phenomenon of the rotation of laying-off cover 2 and kiln tail 1, and at the same time, there will not be too large gap, with the too large gap causing the guiding function to be lost. The guiding function here is to control the coaxiality between the center of the "herringbone"-shaped rubber sealing ring of the sealing mechanism 4 and the kiln tail 1, which is beneficial to protect the rubber seal, so that it is in a good sealing state.

Herein, the guiding sliding ring 51 may be a wear-resistant copper sliding ring. The fixing sliding ring 53 jumps along with the jumping (bounce) of the kiln tail 1, that is, it jumps following the jumping of the smooth sliding belt 11 when rotating. The fixing sliding ring 53 controls the "herringbone"-shaped rubber sealing ring to jump together with the fixing sliding ring 53. Due to the arrangement of the guiding mechanism 5—the wear-resistant copper sliding ring, the phenomenon of eccentric compression and eccentric wear will not appear between the sealing ring and the smooth sliding belt 11, so that the rubber seal can be used for a longer time.

Further, the outer side of the guiding sliding ring 51 is provided with a fixing member, and the fixing member comprises a fixing sliding ring 53 or a step of the inner wall of the laying-off cover cylinder 21.

For reference, the "herringbone"-shaped rubber sealing ring is provided with a first oil hole 43 configured to be filled with lubricating oil. The guiding sliding ring 51 is provided with a second oil hole 52 configured to be filled with lubricating oil. The arrangement of the first oil hole 43 and the second oil hole 52 can increase the lubricity of the corresponding structure, reduce the frictional force, and increase the service life.

Moreover, by providing the guiding mechanism 5, the axis of the laying-off cover 2 can be coincident with the axis of the rotary kiln, or the deviation is within a small range, so that the eccentricity between the sealing ring and the kiln tail 1 in the entire circumferential direction is small, and the sealing compensation is uniform, preventing the eccentric compression condition and extending the life of the sealing ring.

Further, the dynamic sealing structure also comprises a discharging system 3 disposed below the laying-off cover cylinder 21, and the discharging system 3 comprises a laying-off port 31, a laying-off port sealing mechanism 32 and a receiving silo port 33. The laying-off port 31 is located between the end face of the kiln tail 1 and the end face of the laying-off cover 2. One end of the laying-off port 31 is connected to the bottom of the laying-off cover cylinder 21, and the other end thereof is connected to the receiving silo port 33 through the laying-off port sealing mechanism 32 (for example, in sealing connection through the flange); and the laying-off port sealing mechanism 32 is similar to the water sealing structure, and it is filled with liquid low-temperature alloy.

Optionally, the liquid low-temperature alloy filled in the laying-off port sealing mechanism 32 may include lead, tin and bismuth. Preferably, the low-temperature alloy filled in the laying-off port sealing mechanism 32 is composed of lead, tin and bismuth. The above three metals not only have a low melting point, but also have a relatively high density, and the alloy composed of them has a lower melting point, less than 100° C. and it is the ideal material for the liquid sealing with an environmental temperature higher than 300° C.

It is worth noting that in the embodiment of the present application, the liquid low-temperature alloy is filled in the laying-off port sealing mechanism 32, because during the operation, the liquid low-temperature alloy is in a liquid state, and the liquid can flow. During the operation, the temperature of coal gas and the environmental temperature around the sealing mechanism 4 can ensure that the low-temperature alloy is in a liquid state. The density of the liquid low-temperature alloy is about 10 times that of water. Usually, the coal gas in the kiln body is under positive pressure, and the pressure difference is generally less than or equal to 8000 Pa and then, the liquid level difference between the inside and the outside of the laying-off sealing mechanism 4 is relatively small. Generally, the liquid level difference is less than or equal to 80 mm, which is 10 times smaller than that of water for sealing. The melting temperature of the liquid alloy does not exceed 100° C., and this is impossible for water when being seal in an environment with a temperature greater than 300° C., which is more reliable.

A reliable seal is provided between the laying-off port 31 and the receiving silo port 33 arranged on the laying-off cover 2, so that coal gas leakage can be effectively prevented.

Further, the dynamic sealing structure also comprises a coal gas outlet system 7. The coal gas outlet system 7 comprises a coal gas outlet 71, a coal gas outlet sealing mechanism 72, and a coal gas pipeline port 73. The coal gas outlet 71 is arranged on the laying-off cover 2 (specifically, arranged on the top end of the laying-off cover cylinder 21). One end of the coal gas outlet 71 is connected to the laying-off cover 2, and the other end is connected to the coal gas pipeline port 73 through the coal gas outlet sealing mechanism 72. The coal gas outlet sealing mechanism 72 is filled with liquid low-temperature alloy.

A reliable seal is provided between the coal gas outlet 71 and the coal gas pipeline port 73 arranged on the laying-off cover 2, thereby further effectively preventing the coal gas leakage.

For reference, the coal gas outlet 71 is arranged at the top end of the cylinder of the laying-off cover 2 and communicates with the laying-off cover 2. Alternatively, the coal gas outlet 71 is provided on the end face of the laying-off cover 2 and communicates with the laying-off cover 2. Alternatively, the coal gas outlet 71 is provided on one side or both sides of the cylinder of the laying-off cover 2, and communicates with the laying-off cover 2. In the embodiment of the present application, the coal gas outlet system 7 and the discharging system 3 may share one discharging system 3.

Optionally, the low-temperature alloy filled in the coal gas outlet sealing mechanism 72 may include lead, tin and bismuth. Preferably, the low-temperature alloy filled in the coal gas outlet sealing mechanism 72 is composed of lead, tin and bismuth.

Further, the balancing device 6 is connected to the upper part of the outer side of the laying-off cover cylinder 21, and the balancing device 6 is configured to control the laying-off cover 2 to exert the force as little as possible on the kiln tail 1 in any direction, so as to reduce the frictional force and the wear amount between the guiding sliding ring 51 and the smooth sliding belt 11 as much as possible, the force applied to the kiln tail 1 is at least controlled to be less than or equal to 10% of the gravity of the laying-off cover 2, and more preferably, it is configured to control the laying-off cover 2 to apply to the kiln tail 1 the force less than or equal to 5% of the gravity of the laying-off cover 2 in any direction. It is worth noting that the smaller the applied force is, the more the frictional force of the guiding mechanism 5 can be reduced, and the more durable the guiding mechanism 5 and the sealing mechanism 4 are.

Optionally, the balancing device 6 comprises a plurality of (such as, 3 or 4) connected lifting lugs disposed on the outer wall of the laying-off cover cylinder 21, and the plurality of lifting lugs are arranged at intervals (that is, there is a certain distance between the lifting lugs). The plurality of lifting lugs are all located outside the gravity center of the laying-off cover 2, and it is not possible that all the lifting lugs are on the same side of the gravity center of the laying-off cover 2. If there are two lifting lugs on both sides of the axis of the laying-off cover 2, the two lifting lugs thereof are arranged symmetrically with the vertical line of the gravity center of the laying-off cover 2. The lifting lugs can be arranged on the upper part of the outer wall of the laying-off cover cylinder 21, or on the side part, or on the bottom, which can be arranged according to the specific situation. Relatively speaking, it is relatively simple to arrange the lifting lugs on the upper part and however, there may be a possibility that the circular shape of the laying-off cover cylinder 21 is elongated up and down. This tendency can be reduced by increasing the stiffness of the lifting lugs. If the lifting lugs are arranged on the side part, the tendency to form an ellipse is relatively small, from the perspective of force. If the lifting lugs are arranged at the bottom, the tendency to form an ellipse is relatively small from the perspective of force, but the hoisting is relatively complicated.

By providing three or four lifting lugs, it is beneficial to adjust the balance of the laying-off cover 2, including the symmetrical adjustment and the axis adjustment of the laying-off cover 2.

For reference, in order to keep away from the coal gas outlet system 7, a pair of symmetrical lifting lugs are arranged on the laying-off cover cylinder 21, close to the end face of the laying-off cover 2, and one lifting lug is arranged on the top end of the laying-off cover cylinder 21, away from the end face of the laying-off cover 2. The positions of the three lifting lugs are respectively located outside the gravity center of the laying-off cover 2, and the above three lifting lugs are not on one side of the gravity center of the laying-off cover 2.

Further, each lifting lug is connected with a steel cable 61 with an adjustable length (called as a length-adjustable steel cable), and the other ends of all the steel cables 61 away from the lifting lugs are commonly connected to a steel ring 62.

Optionally, a first tensioner 63 which is upward is connected above the steel ring 62. When the laying-off cover 2 is in the hoisted state, the length-adjustable steel cables 61 mentioned above are adjusted, so that the axis of the laying-off cover 2 is parallel to the axis of the inclined rotary kiln, and the tension force of the first tensioner 63 is equal to the gravity of the laying-off cover 2.

In this embodiment, when the laying-off cover 2 is in the hoisted state, three length-adjustable steel cables 61 are adjusted, so that the two sides of the laying-off cover 2 are symmetrical with respect to the vertical line, and the axis of the laying-off cover 2 is parallel with the axis of the inclined rotary kiln. The tension force of the first tensioner 63 is equal to the gravity of the laying-off cover 2.

In some embodiments, the first tensioner 63 is a pulley mechanism or a constant force spring hanger, and correspondingly, the tension force of the first tensioner 63 is a counterweight provided by the pulley mechanism or the tension force of a constant force spring hanger.

Herein, the constant force spring hanger is designed according to the moment balance principle. Under the allowable load displacement, its load moment and the spring force are kept in balance, which is suitable for pipelines and apparatus with thermal displacement in the industry, and can obtain a constant supporting force, and therefore it will not bring the additional stress to pipelines and apparatus; and has the technical effect of compact structure.

Optionally, the balancing device 6 further comprises a frame 64 disposed on both sides of and above the laying-off cover 2, and the frame 64 is configured to bear the tension force generated by the first tensioner 63.

Further, the balancing device 6 also comprises at least one pair of second horizontal tensioners disposed between the two sides of the cylinder of the laying-off cover 2 and the frame 64, and the tension forces of each pair of second horizontal tensioners in the horizontal direction are equal to each other in magnitude and opposite in direction.

Preferably, the value of the tension force of the second horizontal tensioner is less than or equal to 5% of the gravity of the laying-off cover 2, so that the stability of the laying-off cover 2 can be controlled (kept) using a smaller force.

In some embodiments, the second horizontal tensioner can also be a pulley mechanism or a constant force spring hanger. Correspondingly, the tension force of the second tensioner 65 is a counterweight provided by the pulley mechanism or the tension force of a constant force spring hanger.

Moreover, the laying-off cover 2 is in a state of force balance by providing the balancing device 6, or the force which is exerted by the laying-off cover 2 to the rotary kiln, is within 5% of the gravity of the laying-off cover 2, thereby reducing the acting force between the laying-off cover 2 and the kiln tail 1 of the rotary kiln and further reducing the frictional force between the guiding mechanism 5 and the sealing mechanism 4 and the kiln tail 1 of the rotary kiln, which prolongs the service life of the guiding mechanism 5, and correspondingly extends the service life of the sealing ring.

The dynamic sealing structure provided by the embodiment of the present application can simultaneously satisfy the sealing between the laying-off cover 2 and the rotary kiln, the sealing between the laying-off port 31 on the laying-off cover 2 and the receiving silo port 33, and the sealing between the coal gas outlet 71 on the laying-off cover 2 and the coal gas pipeline port 73, and also balance the force between the laying-off cover 2 and the rotary kiln, and reduce the frictional resistance.

In addition, the embodiment of the present application also provides a rotary kiln apparatus, which comprises the above-mentioned dynamic sealing structure. That is, the kiln tail 1, the laying-off cover 2, the sealing structure, the guiding structure, the discharging system 3, the balancing device 6 and the like in the rotary kiln apparatus are provided with reference to the above-mentioned dynamic sealing structure.

Figure 2:
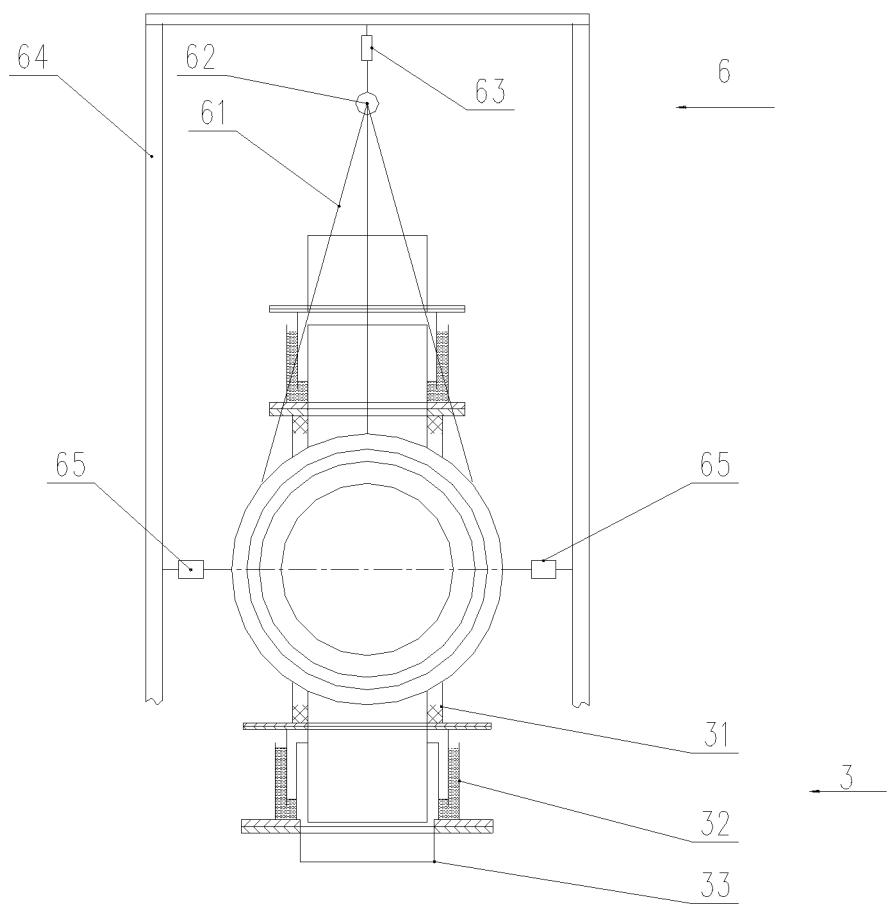
FIG. 2 is the left side view of the dynamic sealing structure provided by Embodiment 1.

Specifically, as shown in FIGS. 1 and 2, this embodiment provides a dynamic sealing structure for a pyrolysis rotary kiln of coal or biomass, including a kiln tail 1, a laying-off cover 2 and a discharging system 3. The laying-off cover 2 is formed by welding one laying-off cover cylinder 21 and one laying-off cover end face 22.

Specifically, the kiln tail 1 comprises a sealed smooth sliding belt 11 arranged on the outer side of the kiln tail 1, and a first ring plate 12 arranged between the inner wall of the sealed smooth sliding belt 11 and the end face of the kiln tail 1. The first ring plate 12 is sealingly welded with the sealed smooth sliding belt 11 and the kiln tail 1. It also comprises a second ring plate 15 arranged on the other end face of the sealed smooth sliding belt 11 away from the end face of the kiln tail 1, and the smooth sliding belt 11 and the second ring plate 15 are connected with each other. There is a gap between the second ring plate 15 and the outer wall of the kiln tail 1. A plurality of adjusting members 14 (adjusting blocks) are arranged on the circumferential wall between the second ring plate 15 and the outer wall of the kiln tail 1, and the plurality of adjusting members 14 are configured to adjust the gap between the inner wall of the sealed smooth sliding belt 11 and the outer wall of the kiln tail 1. A multi-head helical blade 13 forming an angle of 15° with the axis of the kiln tail 1 is arranged between the first ring plate 12 and the second ring plate 15 and on the outer wall of the kiln tail 1, and the multi-head helical blade 13 is welded together with the outer wall of the kiln tail 1. There is a gap between the multi-head helical blade 13 and the inner side wall of the sealed smooth sliding belt 11. A cooling nozzle 16 is arranged on the outer side of the adjusting member 14 away from the end face of the kiln tail 1, and the cooling water is passed through the cooling nozzle 16.

In this embodiment, the laying-off cover cylinder 21 is sleeved outside the circumference of the sealed smooth sliding belt 11, the laying-off cover end face 22 of the laying-off cover 2 is far away from the end face of the kiln tail 1, and the laying-off cover end face 22 of the laying-off cover 2 is away from the end face of the kiln tail 1 by 1.0 m at this time. Further, a sealing mechanism 4 and a guiding mechanism 5 are arranged between the inner wall of the laying-off cover cylinder 21 and the sealed smooth sliding belt 11, the guiding mechanism 5 can be composed of two guiding sliding rings 51, and the sealing mechanism 4 may be composed of two "herringbone"-shaped rubber sealing rings 41. The "herringbone"-shaped rubber sealing ring 41 has two sealing lips 4101 with a deformability or compensation within 6 mm, and the sealing lips 4101 are sealingly contacted with the smooth sliding belt 11. A first spacer ring 42 is provided between the two "herringbone"-shaped rubber sealing rings 41, and one second spacer ring 44 is provided on each of two sides of the two "herringbone"-shaped rubber sealing rings 41. One guiding sliding ring 51 is provided on each of the outer sides of the two second spacer rings 44, and a rotating gap is provided between the guiding sliding ring 51 and the smooth sliding belt 11.

The outer side of the guiding sliding ring 51 (wear-resistant copper sliding ring) is provided with a fixing sliding ring 53, the "herringbone"-shaped rubber sealing ring is provided with a first oil hole 43 configured to be filled with lubricating oil, and the guiding sliding ring 51 is provided with a second oil hole 52 configured to be filled with lubricating oil.

The balancing device 6 is arranged on the upper part of the outer side of the laying-off cover cylinder 21, and the balancing device 6 is configured to control the laying-off cover 2 to exert on the kiln tail 1 a force less than or equal to 5% of the gravity of the laying-off cover 2 in any direction. The discharging system 3 is arranged under the laying-off cover cylinder 21. The discharging system 3 comprises a laying-off port 31, a laying-off port sealing mechanism 32 and a receiving silo port 33. The laying-off port 31 is located between the guiding mechanism 5 and the end face of the kiln tail 1, and one end of the laying-off port 31 is connected with the bottom end of the laying-off cover cylinder 21, and the other end of the laying-off port 31 is connected with the receiving silo port 33 through the laying-off port sealing mechanism 32, and at this time the connection can be sealing connection by the flange. The sealing mechanism 32 of the laying-off port can be filled with an alloy of three low melting-point metals: lead, tin and bismuth.

The laying-off cover 2 is also provided with a coal gas outlet system 7. The coal gas outlet system 7 comprises a coal gas outlet 71, a coal gas outlet sealing mechanism 72 and a coal gas pipeline port 73. The coal gas outlet 71 is arranged at the top end of the laying-off cover cylinder 21, and the coal gas outlet 71 is in the straight form. The coal gas pipeline port 73 is above the coal gas outlet 71, the coal gas outlet sealing mechanism 72 is located between the coal gas outlet 71 and the coal gas pipeline port 73, the lower end of the coal gas outlet 71 is welded and connected with the top end of the laying-off cover cylinder 21, and the upper end of the coal gas outlet 71 can be connected with the lower end of the coal gas outlet sealing mechanism 72 through the flange, the upper end of the coal gas outlet sealing mechanism 72 can be connected with the coal gas pipeline port 73 through the flange, and the coal gas outlet sealing mechanism 72 can be filled therein with an alloy of three low melting-point metals: lead, tin and bismuth.

Optionally, the balancing device 6 is arranged above the laying-off cover cylinder 21. A pair of symmetrical lifting lugs are arranged on the laying-off cover cylinder 21, close to the laying-off cover end face 22 of the laying-off cover 2, and one lifting lug is arranged on the top end of the laying-off cover cylinder 21, away from the laying-off cover end face 22 of the laying-off cover 2. The positions of the three lifting lugs are respectively located outside the center of gravity of the laying-off cover 2, and it is not the case that all the lifting lugs are on one side of the center of gravity of the laying-off cover 2.

The three lifting lugs can be respectively connected with a steel cable 61 with adjustable length, and the other ends of all the steel cables 61 with adjustable length is connected with a steel ring 62. A first tensioner 63 which is upward is connected above the steel ring 62. In the state of the laying-off cover 2 being hoisted, the three length-adjustable steel cables 61 are adjusted, so that the two sides of the laying-off cover 2 are symmetrical with respect to the vertical line, and the axis of the laying-off cover 2 is parallel to the axis of the inclined kiln tail 1, so that the tension force of the first tensioner 63 is equal to the gravity of the laying-off cover 2. The balancing device 6 also comprises a frame 64 arranged on both sides of and above the laying-off cover 2, with the frame configured to bear the tension force generated by the first tensioner 63. The first tensioner 63 can be a constant force spring hanger, which has one end connected to the steel ring 62, and the other end connected to the frame 64.

The balancing device 6 also comprises at least a pair of second tensioners 65 in the horizontal direction, whose forces are equal in magnitude and opposite in direction, arranged between the two sides of the laying-off cover cylinder 21 and the frame 64. The second tensioner 65 is a constant force spring hanger, and the constant force spring hanger has one end connected to one side of the laying-off cover cylinder 21, and the other end connected to the frame 64, and its tension force is less than or equal to 5% of the gravity of the laying-off cover 2.

Figure 3:
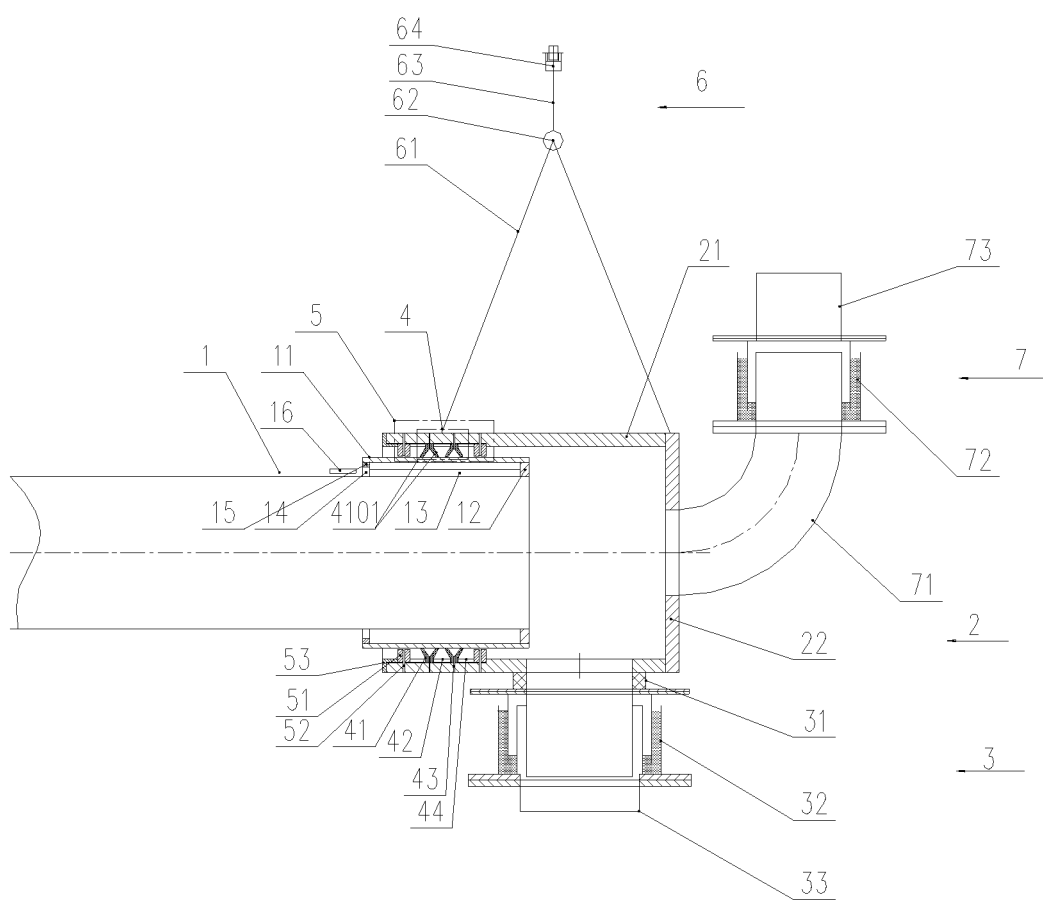
FIG. 3 is a schematic structural view of the dynamic sealing structure provided by Embodiment 2 of the present application.
Figure 4:
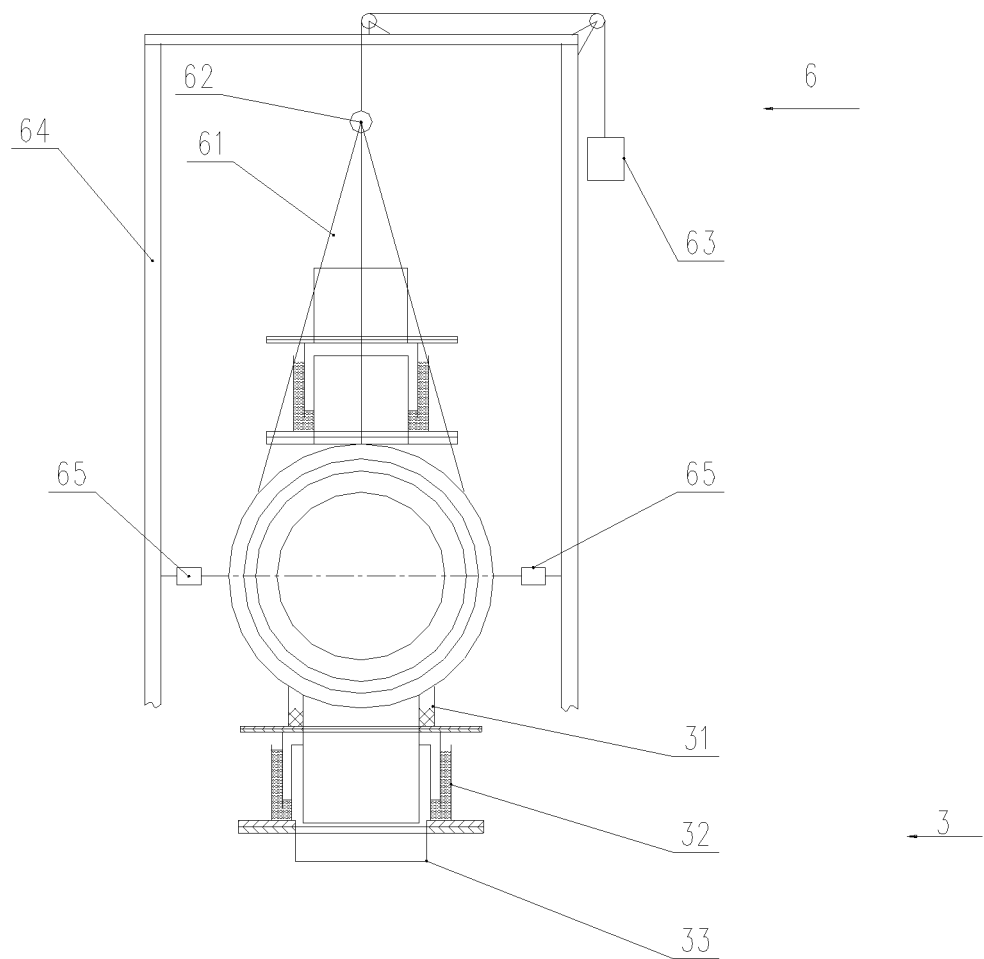
FIG. 4 is a left side view of the dynamic sealing structure provided by Embodiment 2.

As shown in FIGS. 3 and 4, the present embodiment provides a dynamic sealing structure for a pyrolysis rotary kiln of coal or biomass, which is a further structure based on the above-mentioned embodiments of FIGS. 1 and 2. Here, the difference between this embodiment and the previous embodiment is as follows.

(1) The adjusting member 14 is an adjusting bolt.
(2) The outer wall of the kiln tail 1 is provided with inclined plates, instead of helical blades.
(3) Cooling air is passed through the cooling nozzle 16.
(4) The laying-off cover end face 22 of the laying-off cover 2 is spaced from the end face of the kiln tail 1 by 0.8 m.
(5) The coal gas outlet 71 is arranged on the laying-off cover end face 22 of the laying-off cover 2, and the coal gas outlet 71 is a 90° elbow upward that changes from being horizontal;
(6) The first tensioner 63 in the balancing device 6 is a pulley mechanism.

Figure 5:
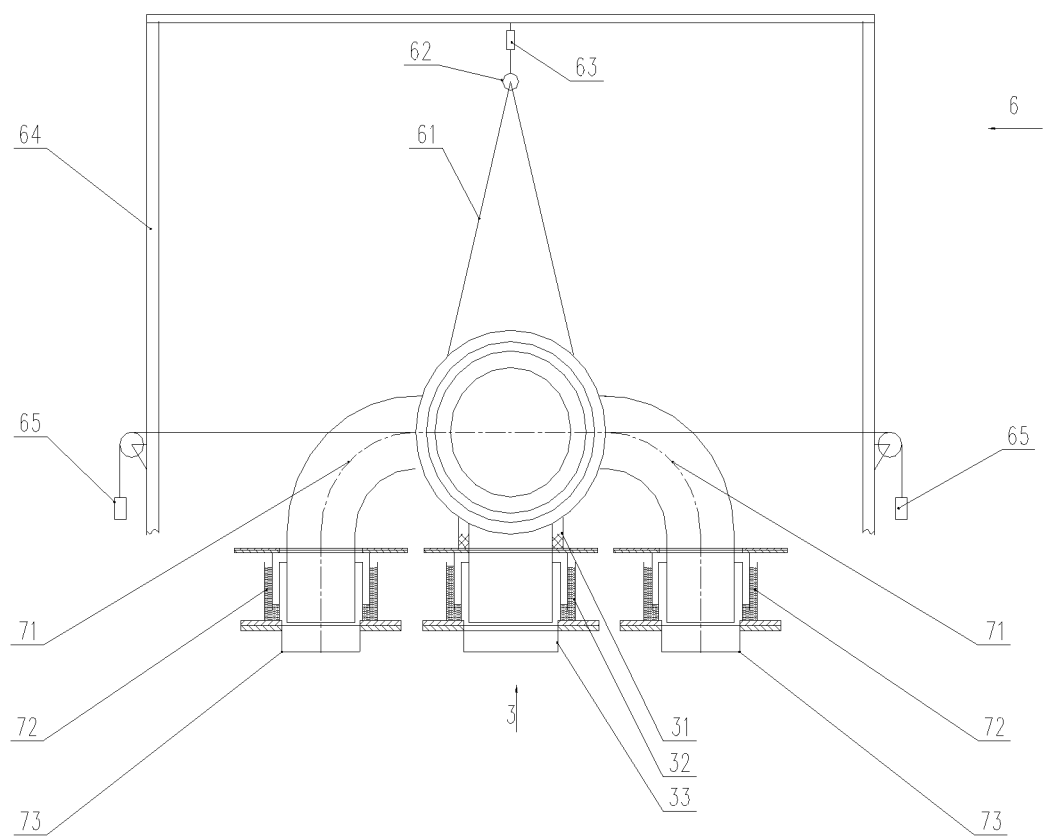
FIG. 5 is a schematic structural view of the dynamic sealing structure provided by Embodiment 3 of the present application.

As shown in FIG. 5, this embodiment provides a dynamic sealing structure for a pyrolysis rotary kiln of coal or biomass, which is a further structure based on the above-mentioned embodiment in FIGS. 1 and 2. Here, the difference between this embodiment and the previous embodiment is: (1) the coal gas outlets 71 are arranged on both sides of the laying-off cover cylinder 21, and the coal gas outlet 71 is a 90° elbow downward that changes from being horizontal, and the coal gas pipeline port 73 is below the coal gas outlet 71, and the coal gas outlet sealing mechanism 72 is between the coal gas outlet 71 and the coal gas pipeline port 73, one end of the coal gas outlet 71 is welded and connected to the side surface of the laying-off cover cylinder 21 and the other end of the coal gas outlet 71 is connected to the upper end of the coal gas outlet sealing mechanism 72 through a flange, and the lower end of the coal gas outlet sealing mechanism 72 is connected with the coal gas pipeline port 73 through a flange;

(2) the balancing device 6 is provided with four lifting lugs (not shown in the figure) on the laying-off cover cylinder 21, wherein in order to balance and stabilize the laying-off cover 2, a pair of symmetrical lifting lugs are provided on the laying-off cover cylinder 21, close to the laying-off cover end face 22 of the laying-off cover 2; a pair of lifting lugs are provided on the laying-off cover cylinder 21, away from the laying-off cover end face 22 of the laying-off cover 2; the positions of the four lifting lugs are respectively located outside the gravity center of the laying-off cover 2 and it is not the case that all the lifting lugs are on one side of the gravity center of the laying-off cover 2; the lifting lugs are respectively connected to a steel cable 61 with an adjustable length, and the other ends of all the steel cables 61 are connected to a steel ring 62; and the first tensioner 63 which is upward is connected above the steel ring 62, and the four length-adjustable steel cables 61 are adjusted in the state of the laying-off cover 2 being hoisted, so that the axis of the laying-off cover 2 is parallel to the axis of the inclined kiln tail 1; and (3) the second tensioner 65 is a pulley mechanism.

Figure 6:
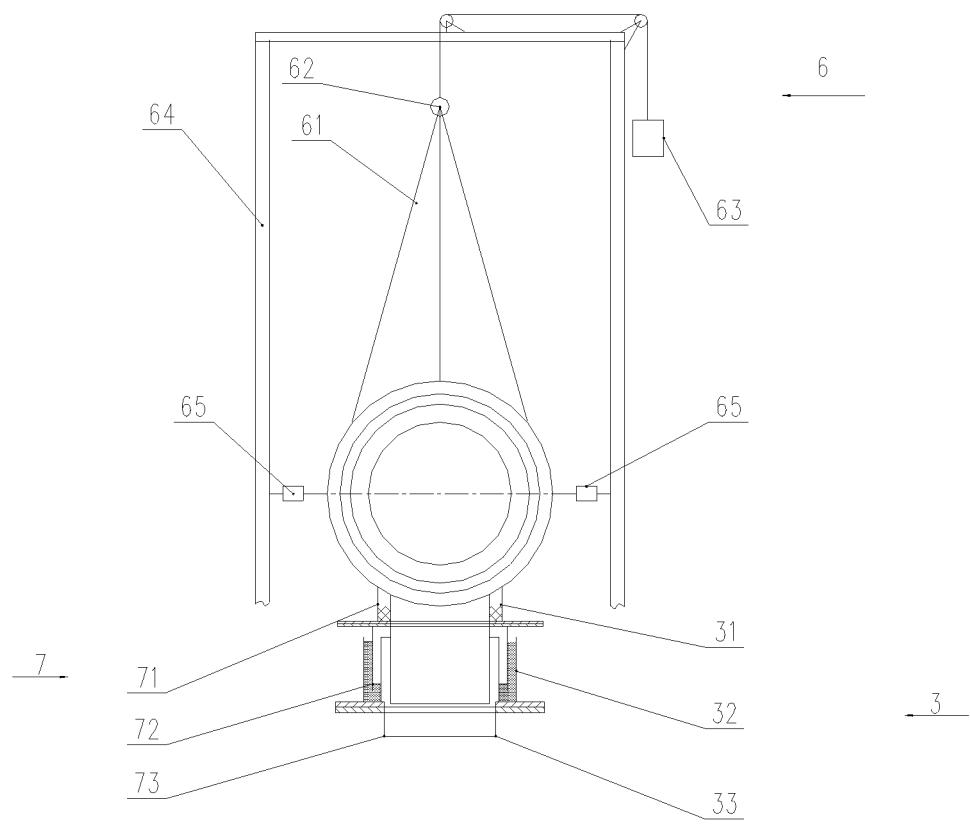
FIG. 6 is a schematic structural view of the dynamic sealing structure provided by Embodiment 4 of the present application.

As shown in FIG. 6, this embodiment provides a dynamic sealing structure for a pyrolysis rotary kiln of coal or biomass, which is a further structure based on the above-mentioned embodiment in FIGS. 1 and 2. The difference between this embodiment and the previous embodiment is as follows.

The coal gas outlet system 7 and the discharging system 3 are combined into one structure, and a common discharging system 3 is used, and the coal gas is separated after reaching the laying-off silo.

Comparative Example 1

In order to adapt to the sealing at the high temperature, a graphite packing is used as the sealing mechanism, and there are two problems: one is that leakage of the coal gas cannot be avoided by sealing; and the second is to press the graphite packing tightly for sealing, resulting in the kiln body not rotating.

Comparative Example 2

In order to make the laying-off cover exert a relatively small force on the rotary kiln, four pressure springs are arranged under the laying-off cover. Since the four pressure springs cannot balance the gravity of the laying-off cover, the difference is far away even, resulting in the serious eccentric wear of the guiding sliding ring. The guiding and protection on the sealing mechanism cannot be achieved, resulting in that the sealing life of the rubber sealing ring is too short.

Comparative Example 3

The laying-off port system, the coal gas outlet system and the laying-off cover are connected fixedly and rigidly, so that the laying-off cover has no space for movement, and the guiding sliding ring cannot play a role of guiding, resulting in the local wear of the rubber sealing ring being too fast, and thus the sealing effect is lost.

In conclusion, the dynamic sealing structure provided by the embodiments of the present application has a good overall sealing effect, is applicable to pyrolysis rotary kilns of coal or biomass, and can solve the problem in the prior art that the sealing performance is poor due to the jumping of the rotary kiln. The rotary kiln apparatus including the above dynamic sealing structure has strong practicability and wide application prospects.

The above are only preferred embodiments of the present application, and are not intended to limit the present application. For those skilled in the art, the present application may have various modifications and changes. Any modifications, equivalent replacements, improvements, etc. made within the spirit and principle of the present application shall be included within the protection scope of the present application.

INDUSTRIAL APPLICABILITY

The dynamic sealing structure and the rotary kiln apparatus provided by the embodiments of the present application have good overall sealing effect, are applicable to pyrolysis rotary kilns of coal or biomass, and can solve the problem in the prior art that the sealing is poor due to the jumping of the rotary kiln.

What is claimed is:

1. A dynamic sealing structure, comprising a kiln tail, a laying-off cover, a sealing mechanism, a guiding mechanism and a balancing device, wherein
the laying-off cover comprises a laying-off cover cylinder and a laying-off cover end face connected with the laying-off cover cylinder, and the laying-off cover cylinder is sleeved on outside of a circumferential wall of the kiln tail, and the laying-off cover end face and an end face of the kiln tail are arranged at an interval;
the sealing mechanism is arranged between the laying-off cover cylinder and the kiln tail and is connected with an inner wall of the laying-off cover cylinder;
the guiding mechanism is arranged between the inner wall of the laying-off cover cylinder and an outer side of the kiln tail and is located on one side or two sides of the sealing mechanism along an axial direction of a rotary kiln, and a rotating gap is provided between the guiding mechanism and the kiln tail, so that the sealing mechanism is coaxial with the kiln tail; and
the balancing device is connected to an outer side of the laying-off cover cylinder and is configured to control the laying-off cover to exert on the kiln tail a force not greater than 10% of gravity of the laying-off cover in any direction, wherein
preferably, an interval between the laying-off cover end face and the end face of the kiln tail in an axial direction of the kiln tail is 0.3-2.0 m;
preferably, the guiding mechanism is located on both sides of the sealing mechanism along the axial direction of the rotary kiln; and
preferably, the rotating gap is greater than a sum of cylindricity error of the kiln tail and cylindricity error of the laying-off cover cylinder.

2. The dynamic sealing structure according to claim 1, wherein the sealing mechanism comprises at least one rubber sealing ring, wherein
preferably, when the at least one rubber sealing ring is in a number greater than 1, a plurality of rubber sealing rings are arranged at intervals along an axial direction of the kiln tail;
preferably, the sealing mechanism is a "herringbone"-shaped rubber sealing ring having two sealing lips; and
preferably, the sealing lips have a deformability or compensation within 6 mm.

3. The dynamic sealing structure according to claim 1, wherein the dynamic sealing structure further comprises a sealed smooth sliding belt arranged on the outer side of the kiln tail, a first ring plate is connected between the smooth sliding belt and the end face of the kiln tail, one end of the smooth sliding belt away from the end face of the kiln tail is connected with a second ring plate, a first gap is provided between the second ring plate and an outer wall of the kiln tail, a plurality of adjusting members configured to adjust size of the first gap are arranged along an circumferential direction, between the second ring plate and the outer wall of the kiln tail, wherein
preferably, an outer wall of the kiln tail between the first ring plate and the second ring plate is provided with a multi-head helical blade or an inclined plate forming an included angle with respect to an axis of the kiln tail;
preferably, a second gap is provided between the multi-head helical blade and an inner side wall of the smooth sliding belt or between the inclined plate and the inner side wall of the smooth sliding belt; and
preferably, a cooling nozzle is provided on an outer side of each of the adjusting members away from the end face of the kiln tail.

4. The dynamic sealing structure according to claim 3, wherein the first ring plate, the sealed smooth sliding belt, and the kiln tail are sealingly welded together.

5. The dynamic sealing structure according to claim 3, wherein each of the adjusting members comprises an adjusting block or an adjusting bolt, which is configured to adjust a coaxiality between the smooth sliding belt and the kiln tail.

6. The dynamic sealing structure according to claim 3, wherein the first ring plate comprises a thermal insulation layer; and the second ring plate comprises a thermal insulation layer.

7. The dynamic sealing structure according to claim 3, wherein an included angle formed between the multi-head helical blade and the axis of the kiln tail is in an angle range of 5-30°; or, an included angle formed between the inclined plate and the axis of the kiln tail is in an angle range of 5-10°.

8. The dynamic sealing structure according to claim 3, wherein the multi-head helical blade is welded with the outer wall of the kiln tail; or
the inclined plate is welded with the outer wall of the kiln tail.

9. The dynamic sealing structure according to claim 3, wherein the sealing mechanism and the guiding mechanism are arranged between the laying-off cover cylinder and the smooth sliding belt, wherein
preferably, the sealing mechanism comprises at least one "herringbone"-shaped rubber sealing ring having two sealing lips, and the sealing lips of the at least one "herringbone"-shaped rubber sealing ring are sealingly contacted with the smooth sliding belt;
preferably, when the at least one "herringbone"-shaped rubber sealing ring is in a number greater than 1, a first spacer ring is provided between two adjacent "herringbone"-shaped rubber sealing rings, and outermost "herringbone"-shaped rubber sealing rings have outer sides which are each provided with a second spacer ring;
preferably, the guiding mechanism comprises two guiding sliding rings, the two guiding sliding rings are respectively arranged on an outer side of the second spacer ring, and a third gap is provided between each of the guiding sliding rings and the smooth sliding belt;
preferably, an outer side of each of the guiding sliding rings is provided with a fixing member, and the fixing member comprises a fixing sliding ring or a step of an inner wall of the laying-off cover cylinder;
preferably, each of the guiding sliding rings is a wear-resistant copper sliding ring;
preferably, each of the at least one "herringbone"-shaped rubber sealing ring is provided with a first oil hole configured to be filled with lubricating oil; and
preferably, each of the guiding sliding rings is provided with a second oil hole configured to be filled with lubricating oil.

10. The dynamic sealing structure according to claim 1, wherein the dynamic sealing structure further comprises a discharging system, and the discharging system is arranged below the laying-off cover cylinder, the discharging system comprises a laying-off port, a laying-off port sealing mechanism and a receiving silo port, wherein the laying-off port is located between the end face of the kiln tail and the laying-off cover end face, and the laying-off port has one end connected with a bottom of the laying-off cover cylinder and the other end connected with the receiving silo port through the laying-off port sealing mechanism; and the laying-off port sealing mechanism is filled with a liquid low-temperature alloy, wherein preferably, the low-temperature alloy filled in the laying-off port sealing mechanism comprises lead, tin and bismuth; and more preferably, the low-temperature alloy filled in the laying-off port sealing mechanism is composed of lead, tin and bismuth.

11. The dynamic sealing structure according to claim 10, wherein the dynamic sealing structure further comprises a coal gas outlet system, the coal gas outlet system comprises a coal gas outlet, a coal gas outlet sealing mechanism and a coal gas pipeline port, wherein the coal gas outlet is arranged on the laying-off cover, the coal gas outlet has one end connected with the laying-off cover and the other end connected with the coal gas pipeline port through the coal gas outlet sealing mechanism, and the coal gas outlet sealing mechanism is filled with a liquid low-temperature alloy, wherein preferably, the coal gas outlet is arranged at a top end of the laying-off cover cylinder and communicates with the laying-off cover;

preferably, the coal gas outlet is arranged on the laying-off cover end face and communicates with the laying-off cover;

preferably, the coal gas outlet is arranged on one side or two sides of the laying-off cover cylinder and communicates with the laying-off cover;

preferably, the coal gas outlet system and the discharging system share one discharging system;

preferably, the low-temperature alloy filled in the coal gas outlet sealing mechanism comprises lead, tin and bismuth; and more preferably, the low-temperature alloy filled in the coal gas outlet sealing mechanism is composed of lead, tin and bismuth.

12. The dynamic sealing structure according to claim 1, wherein the balancing device comprises connected lifting lugs provided on an outer wall of the laying-off cover cylinder, and the plurality of lifting lugs are provided as spaced apart from each other, and the plurality of lifting lugs are all located outside a gravity center of the laying-off cover and it is not the case that all of the lifting lugs are on the same side of the gravity center of the laying-off cover.

13. The dynamic sealing structure according to claim 12, wherein a pair of symmetrical lifting lugs are arranged on the laying-off cover cylinder, near the laying-off cover end face, and one lifting lug is provided on the laying-off cover cylinder, at a top end away from the laying-off cover end face, wherein the three lifting lugs are respectively located outside of the gravity center of the laying-off cover, and the three lifting lugs are not on one side of the gravity center of the laying-off cover.

14. The dynamic sealing structure according to claim 12, wherein the lifting lugs are arranged on an upper part of the outer wall of the laying-off cover cylinder; or the lifting lugs are arranged on a side part of the outer wall of the laying-off cover cylinder; or the lifting lugs are arranged at a bottom of the outer wall of the laying-off cover cylinder.

15. The dynamic sealing structure according to claim 12, wherein each of the lifting lugs is connected with a steel cable with an adjustable length, and the other ends of all steel cables away from the lifting lugs are together connected with a steel ring, wherein preferably, a first tensioner which is upward is connected above the steel ring;

preferably, the first tensioner is a pulley mechanism or a constant force spring hanger; and preferably, the balancing device further comprises a frame disposed on both sides of and above the laying-off cover, and the frame is configured to bear a tension force generated by the first tensioner.

16. The dynamic sealing structure according to claim 15, wherein when the laying-off cover is in a hoisted state, the steel cable configured to adjust the adjustable length is configured in such a way that an axis of the laying-off cover is parallel to an axis of an inclined rotary kiln, so that a tension force of the first tensioner is equal to a gravity of the laying-off cover.

17. The dynamic sealing structure according to claim 15, wherein the balancing device further comprises at least one pair of second horizontal tensioners disposed between two sides of the laying-off cover cylinder and the frame, wherein tension forces of each pair of the second horizontal tensioners in a horizontal direction are equal to each other in magnitude and opposite in direction, wherein preferably, each of the second horizontal tensioners is a pulley mechanism or a constant force spring hanger; and preferably, a value of a tension force of each of the second horizontal tensioners is less than or equal to 5% of a gravity of the laying-off cover.

18. The dynamic sealing structure according to claim 1, wherein a spacing distance between the laying-off cover end face and the end face of the kiln tail in an axial direction of the kiln tail is positively proportional to a diameter of the rotary kiln; and the spacing distance between the laying-off cover end face and the end face of the kiln tail in the axial direction of the kiln tail is positively proportional to a discharge amount of the rotary kiln.

19. A rotary kiln apparatus, wherein the rotary kiln apparatus comprises the dynamic sealing structure according to claim 1.

* * * * *